Nov. 3, 1942.     W. A. SCOTT     2,300,833
MILKING MACHINE TEAT CUP
Filed April 8, 1940
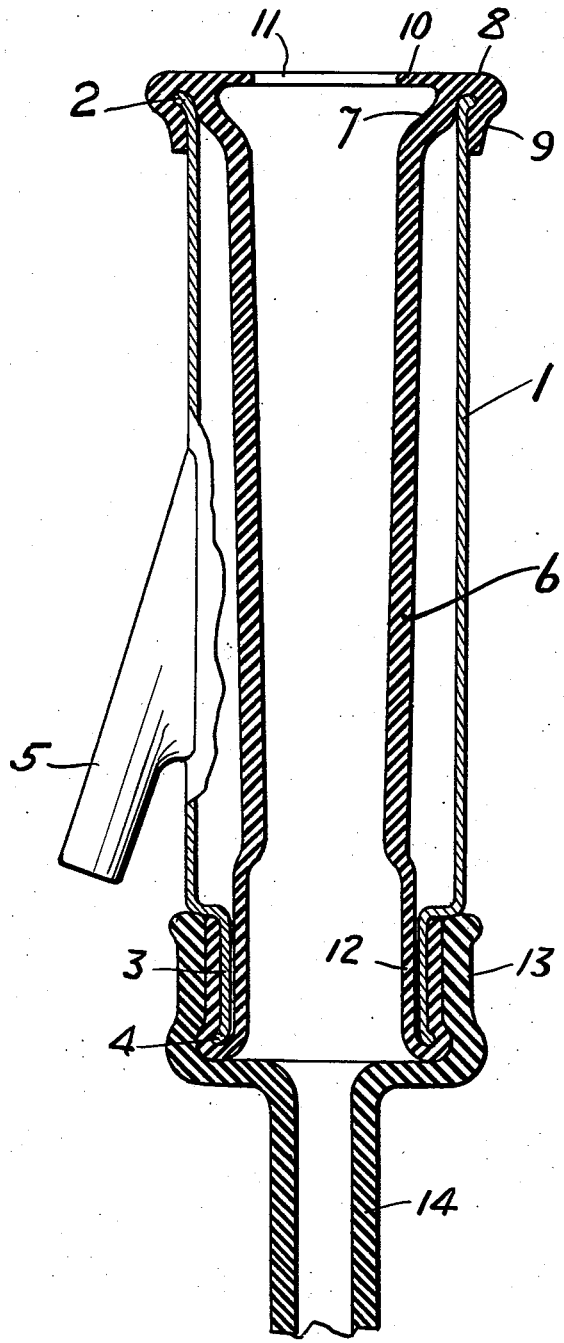
WITNESS:
INVENTOR
Walter A. Scott
BY
ATTORNEYS.

Patented Nov. 3, 1942

2,300,833

UNITED STATES PATENT OFFICE 2,300,833

MILKING MACHINE TEAT CUP

Walter A. Scott, Poughkeepsie, N. Y., assignor to The De Laval Separator Company, New York, N. Y., a corporation of New Jersey Application April 8, 1940, Serial No. 328,456

2 Claims. (Cl. 31—85)

My invention is an improved teat cup for milking machines and particularly a flexible elastic liner therefor.

The object of my invention is the provision of a teat cup that is easily assembled and disassembled without special tools, will keep its original size and shape through long use and is easy to clean.

I have found that for best results the teat-enclosing portion of a liner should be a little larger at the top than at the bottom, in order to keep its size and shape, should be made quite thick and should be supported from the top of the shell by an outward extension having a thickness at least equal to that of the teat-enclosing portion and which fits tightly around the top of the shell. I have found also that, in order to prevent inlet of air and consequent falling off from teat, there should be a relatively thin inward extension from the extreme top of the liner forming a mouth adapted to fit closely around a teat but which should not so unduly constrict it as to interfere with the flow of milk.

It is highly desirable that the tea-enclosing portion should be held to its proper size and location. To insure this I have provided, below that portion, an extension of a somewhat larger diameter but having a substantially thinner wall so that, when it is pulled through the bottom of a shell, it can be stretched a considerable amount and thereby be subjected to tension, thus holding the teat-enclosing portion in place but without causing any appreciable longitudinal stretching and consequent reduction of diameter of that portion.

The above described features of the invention are capable of independent use, but are advantageously combined in order to accomplish all the objects of the invention.

Referring to the single figure, which shows an embodiment of my invention in vertical section—

The rigid cylindrical teat cup shell 1 is of known construction, having at its top a bead 2 and at the other end a reduced diameter neck 3 with a bead 4 and, at one side, a pulsation nipple 5.

Inside the shell is a flexible elastic liner, usually made of rubber, having a relatively thick-walled teat-receiving body portion 6 which tapers inward from its upper portion toward its lower end. At the top the body portion 6 is connected, by a short enlarged portion 7, with an equally thick horizontal portion 8 conected with another portion 9 adapted to be stretched tightly around outside of and below the bead 2. From the inner edge of the horizontal portion 8 a substantially thinner portion 10 extends inward to form a mouth 11.

Beyond the lower end of the teat-receiving prtion 6 the diameter is increased and the thickness is decreased to form a relatively thin-walled cylindrical extension 12. This extension is pulled down through and turned upward around the outside of the shell neck 3 against which it is held by the expanded head 13 of a milk tube 14, as described in my earlier application Ser. No. 269,846, filed April 25, 1939.

Because the wall of the teat-receiving portion of the liner is much thicker than that of the downward extension therefrom, this portion will closely retain its size and shape in spite of the longitudinal tension that is required to hold it in position and that is put on it by stretching the extension through the neck at the bottom of the shell and turning it up outside thereof.

The material surrounding the mouth is so thin that it will be easily stretched to admit a teat and yet is thick enough to provide a seal that will prevent entrance of air that might break the vacuum inside the cup and allow it to fall off.

When the milk tube 14, with its expanded head 13, is removed the entire interior of the liner is easily accessible for cleaning and inspection.

The upper end of the liner is large enough to permit it to be easily forced around the top of a shell and yet small enough to hug it tightly after it is in place. The liner is long enough to cause the end of the thin lower extension to project through the bottom of the shell so that it can be grasped by a thumb and fingers, stretched enough to place the necessary tension on the teat-enclosing portion and then turned upward around the shell. The required tension is so little that it can be easily provided without any tools. The wall of the teat-enclosing portion, while sufficiently flexible and elastic to respond to pneumatic pulsations, is so substantial that it will maintain its size and shape through long use.

The relative thicknesses of the wall of the teat-enclosing portion, of the wall of the lower extension and of the mouth piece are capable of some variation. I prefer, however, that the mouth piece 10 should be about three-fourths the thickness of the wall of the teat-engaging portion 6 and that the wall of the lower extension 12 should be about four-fifths the thickness of the wall of the teat-engaging portion. The diameter of the cylindrical extension may be thirty per cent.

greater than the diameter of the adjacent lower end of the teat-engaging portion and should not be less than, and should preferably somewhat exceed, the diameter of the upper portion of the teat-engaging portion just below its expanded top. Considerable variation from these relative diameters and thicknesses is consistent with the above described operation and advantages.

The teat cup shown will be recognized as of that type wherein continuous low pneumatic pressure is maintained within the liner and milk tube, while the annular space between the shell and liner is subject alternately to high and low pneumatic pressures. The liner, however, is not necessarily limited to use in a teat cup having this mode of operation.

What I claim and desire to protect by Letters Patent is:

1. In a milking machine teat cup, the combination with a rigid shell having a neck of reduced and uniform diameter at its lower end, of a liner of flexible and elastic material the upper end of which is provided with an outward extension adapted to engage the top of the shell and an inwardly extending annular mouth piece adapted to engage the teat, the wall of the main and relatively long body of the liner being comparatively thick so as to tend to maintain the size and shape of the liner body, and of uniform thickness both longitudinally and circumferentially, the lower and relatively short shell-engaging end portion of the liner being expanded in internal and external diameter to form an extension the diameter of which approximates the internal diameter of the shell neck and being substantially thinner and therefore more flexible and elastic than the main body of the liner to enable it to be readily engaged with the lower end of the reduced diameter shell neck and to be held thereon in known manner.

2. A teat cup as defined in claim 1 in which the diameter of the main body of the liner gradually decreases from its upper end to its junction, at its lower end, with said expanded extension.

WALTER A. SCOTT.